United States Patent
Aggarwal et al.

(10) Patent No.: US 11,750,670 B2
(45) Date of Patent: Sep. 5, 2023

(54) ELECTRONIC SIGNATURE COLLECTION WITHIN AN ONLINE CONFERENCE

(71) Applicant: Adobe Inc., San Jose, CA (US)

(72) Inventors: Anurag Aggarwal, Noida (IN); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 32 days.

(21) Appl. No.: 17/012,917

(22) Filed: Sep. 4, 2020

(65) Prior Publication Data

US 2020/0404029 A1    Dec. 24, 2020

Related U.S. Application Data

(63) Continuation of application No. 15/331,498, filed on Oct. 21, 2016, now Pat. No. 10,855,732.

(51) Int. Cl.
   *G06F 40/174*    (2020.01)
   *H04L 65/403*    (2022.01)

(52) U.S. Cl.
   CPC .......... *H04L 65/403* (2013.01); *G06F 40/174* (2020.01)

(58) Field of Classification Search
   CPC ............. H04L 12/1813; H04L 12/1822; H04L 65/403; H04N 7/15; G06F 40/174; G06Q 10/101
   See application file for complete search history.

(56) References Cited

U.S. PATENT DOCUMENTS

| | | |
|---|---|---|
| 10,855,732 B2 | 12/2020 | Aggarwal et al. |
| 2003/0070072 A1* | 4/2003 | Nassiri .................. H04L 9/3247 713/168 |
| 2010/0037062 A1 | 2/2010 | Carney |
| 2011/0268418 A1 | 11/2011 | Jones et al. |
| 2011/0276875 A1 | 11/2011 | McCabe et al. |
| 2013/0019289 A1 | 1/2013 | Gonser et al. |
| 2013/0174095 A1 | 7/2013 | Dayan |
| 2014/0244451 A1* | 8/2014 | Mayer .............. G06Q 20/40145 705/30 |
| 2015/0149324 A1* | 5/2015 | Szymanski ........ G06Q 30/0635 715/224 |
| 2015/0188711 A1* | 7/2015 | Kirgan .................. H04L 9/3247 713/176 |
| 2015/0310188 A1 | 10/2015 | Ford et al. |
| 2016/0057388 A1* | 2/2016 | Rung .................. H04M 7/0027 348/14.08 |

(Continued)

OTHER PUBLICATIONS

"Final Office Action", U.S. Appl. No. 15/331,498, dated Jan. 31, 2019, 16 pages.

(Continued)

*Primary Examiner* — Tan H Tran
(74) *Attorney, Agent, or Firm* — FIG. 1 Patents

(57) ABSTRACT

Techniques and systems are described that support collection of electronic signatures within an online conference. At least one user input is received as part of the online conference. The user input specifies an attendee of the online conference that is provide an electronic signature. A signature module is communicated within the online conference. The signature module is configured to receive the electronic signature from the attendee. The electronic signature received via the signature module from the attendee within the online conference is applied to the digital content.

20 Claims, 12 Drawing Sheets

(56) References Cited

U.S. PATENT DOCUMENTS

| | | |
|---|---|---|
| 2016/0132693 A1 | 5/2016 | Kumar et al. |
| 2018/0048864 A1* | 2/2018 | Taylor .............. G06Q 20/40145 |
| 2018/0113845 A1 | 4/2018 | Aggarwal et al. |
| 2018/0373859 A1* | 12/2018 | Ganong ................. G06F 21/36 |
| 2019/0036707 A1* | 1/2019 | Eliezer ................. H04L 9/3247 |

OTHER PUBLICATIONS

"Final Office Action", U.S. Appl. No. 15/331,498, dated Dec. 20, 2019, 16 pages.
"Non-Final Office Action", U.S. Appl. No. 15/331,498, dated Oct. 24, 2019, 15 pages.
"Non-Final Office Action", U.S. Appl. No. 15/331,498, dated Aug. 27, 2018, 17 pages.
"Notice of Allowance", U.S. Appl. No. 15/331,498, dated Jul. 30, 2020, 12 pages.

* cited by examiner

ELECTRONIC SIGNATURE COLLECTION WITHIN AN ONLINE CONFERENCE

RELATED APPLICATIONS

This application claims priority as a continuation to U.S. patent application Ser. No. 15/331,498, filed Oct. 21, 2016, and titled "Electronic Signature Collection within an Online Conference," the entire disclosure of which is hereby incorporated by reference.

BACKGROUND

Collection of signatures on documents has progressed from conventional techniques that involve pen and paper to electronic signatures. For example, conventional signatures involving pen and paper are often collected by requiring parties that are to sign a document to gather at a common geographic location and then sign the documents together as a way to witness the signatures. Thus, this afforded the parties an opportunity to witness the signing of the document but involved the hassle and inconvenience of requiring travel by the parties.

With the advent of electronic signatures, conventional techniques have advanced to permit the parties to sign individual copies of a digital document electronically and share these signed documents with each other over a network, e.g., via email. Thus, signing of the digital documents may then be performed by the parties at different times and places from each other. However, this conventional technique does not afford the parties an opportunity to witness signatures of the other parties as with conventional pen and paper. This may also increase difficulty in maintenance of audit trails used to authenticate and verify the signatures, such as who signed the document, when the document was signed, how the document was signed, and so forth.

SUMMARY

Techniques and systems are described that support collection of electronic signatures within an online conference. Digital content, such as a document, is viewed within an online conference, e.g., a web conference, online meeting, and so forth. A host of the online conference selects an option to enable electronic signatures of the digital content, and may also specify who is to provide the signatures. This causes a signature module to be communicated within the online conference (e.g., from a conference host module to a conference client module) to collect the electronic signature.

The host, for instance, may select representations of an attendee of the conference that is to provide the electronic signature and position a representation of a signature module (e.g., displayed as a "sign here" sticker) in a user interface at a location within the digital content at which the electronic signature is to be placed. A view of the digital content and the inserted signature module are then communicated to the attendee that is to electronically sign the digital content within the online conference.

To sign the document, the attendee selects a representation of the signature module to insert an electronic signature. This may be performed through manual input of the electronic signature (e.g., drawn or by text), importation of the electronic signature from a local or remote source, and so forth. The electronic signature is then communicated by the signature module and stored as part of the digital content and is not further modifiable by the attendee, e.g., at a host device or conference management system.

The host may thus view the signing of the digital content within the online conference, and thus may witness the electronic signature. Further, audit trail data may also be collected that describes signature transactions used to collect the electronic signature, such as how communicated, how provided, timestamps, and so forth. In this way, this audit trail data may also be used to verify authenticity of the electronic signature.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 8 depicts a user interface in an example implementation in which an attendee of an online conference is exposed to a representation of a signature module that is to be used to collect an electronic signature from the attendee.

FIG. 9 depicts a user interface in an example implementation in which an electronic signature is collected from the attendee of FIG. 8.

DETAILED DESCRIPTION

Overview

Figure 1:
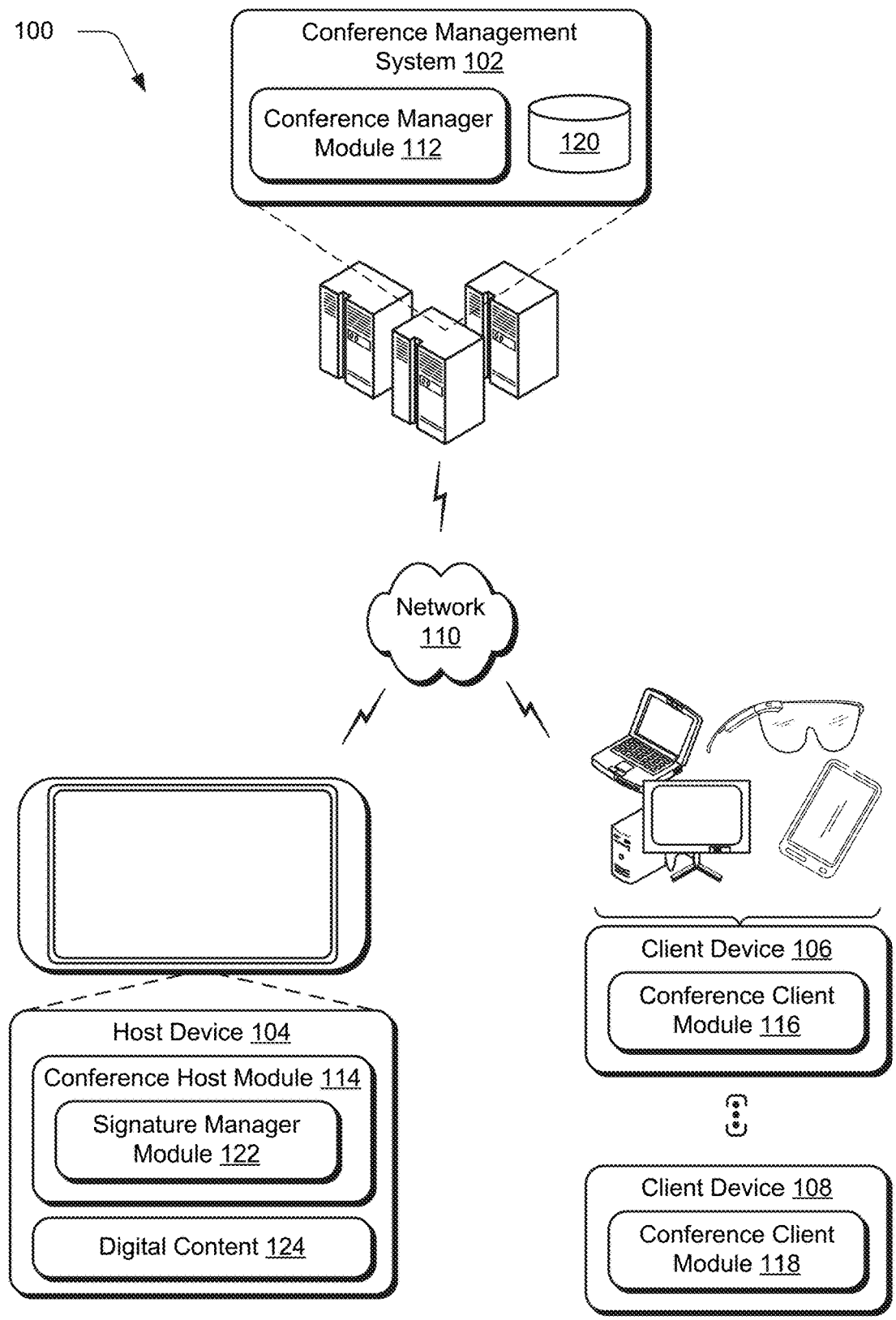
FIG. 1 is an illustration of an environment in an example implementation that is operable to employ electronic signature and online conference techniques described herein.

Techniques and systems are described that support collection of electronic signatures within an online conference. An online conference is implemented as an online collaborative service, via which, attendees of the conference interact via a network. This interaction may involve use of audio and/or video communicated over the network via respective computing devices of the attendees, such as mobile phones, desktop computers, tablets, and so forth. Online conferences may take a variety of forms, such as web seminars, webcasts, web meetings, and other collaborative sessions implemented via a network such as the Internet. As such, online conferences may be used to connect attendees in real time across a wide range of geographic distances (e.g., different offices to across the world) to interact regarding whatever topic is desired using respective computing devices.

Through use of the techniques and system described herein, electronic signatures may be collected as part of a document or other digital content shared within the online conference. For example, digital content such as documents, spreadsheets, images, multimedia, and so forth may be viewed by the attendees as part of the online conference. In some instances, this digital content is to be electronically signed by the attendees, such as for legal documents, contracts, agreements, and so forth. By enabling collection of electronic signatures from within the online conference (e.g., through interaction of conference host module and conference client module), attendees of the conference may witness the signatures, which is not possible using conventional electronic signature techniques. Further, the online signatures may leverage authentication performed as part of the online conference, thereby increasing a likely authenticity of the electronic signatures as opposed to conventional network communication techniques used to collect electronic signatures, e.g., email, that do not have this authentication in order to access the document to be signed.

To do so, a host of the online conference, through interaction with a host device, causes communication of a signature module to attendees that are to sign digital content. The host, for instance, may select an option to "enable e-signing" in a user interface of the host device for digital content being displayed as part of the online conference. In response, a representation of a signature module is inserted at a point in the digital content that is to receive the signature by the host device from an attendee of the conference.

The representation of the signature module, for instance, may appear as a "party 1, sign here" sticker that is positioned by the host at a location within the digital content that is to receive the electronic signature, e.g., a signature line, from this attendee. This positioning may also be performed automatically and without user intervention, such as through text and image analysis of the digital content to locate a signature line that corresponds to a name of an attendee of the conference. This automatic location may then be refined by the host if desired through interaction with a user interface of the online conference.

The host, through interaction with the host device, may then initiate a command to cause a view of the digital content as well as the signature module to be shared with (i.e., displayed to) respective attendees of the conference that are to electronically sign the content. For example, the digital content may be automatically displayed to the attendees, from which, the signature module is specified to receive an electronic signature.

The respective attendees then view the digital content within the online conference at respective client devices. Selection of the representation of the signature module within the view of the digital content then invokes the signature module to collect the electronic signature. Collection of the electronic signature may be performed locally (e.g., through user input or locally-stored signature) or remotely via a remote service provider system having a stored copy of the electronic signature. Once collected, the respective attendee may then select an option to commit the electronic signature to the digital content, at the location within the digital content. This causes communication of the electronic signature, within the online conference, for insertion as part of the digital content and may include location information specifying the location within the digital content, at which, the signature is to be inserted. Once committed, the electronic signature is not further modifiable and thus protects against tampering by potentially malicious parties.

As this process is being performed, the host may view the attendee's interaction with the view of the digital content and the provision of the electronic signature in real time, which is not possible using conventional electronic signature techniques. Further, audit trail data may also be collected along with the electronic signature that describes signature transactions involved in the collection of the electronic signature, e.g., user credentials, time stamps, identification of a device used to collect the electronic signature, source of the electronic signature (e.g., local or remote), and so forth. In this way, electronic signatures may be collected in a manner that is witnessed using the online conference and leverages authentication of the online conference, which is not possible using conventional electronic signature techniques. Further discussion of this and other examples is included in the following and shown in a corresponding figure.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ electronic signature and online conference techniques described herein. The illustrated environment 100 includes a conference management system 102, a host device 104, and a plurality of client devices 106, . . . , 108 that are communicatively coupled, one to another, via a network 110. The conference management system 102, host device 104, and plurality of client devices 106, 108 are implemented using one or more computing devices, which may be configured in a variety of ways.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices).

Figure 12:
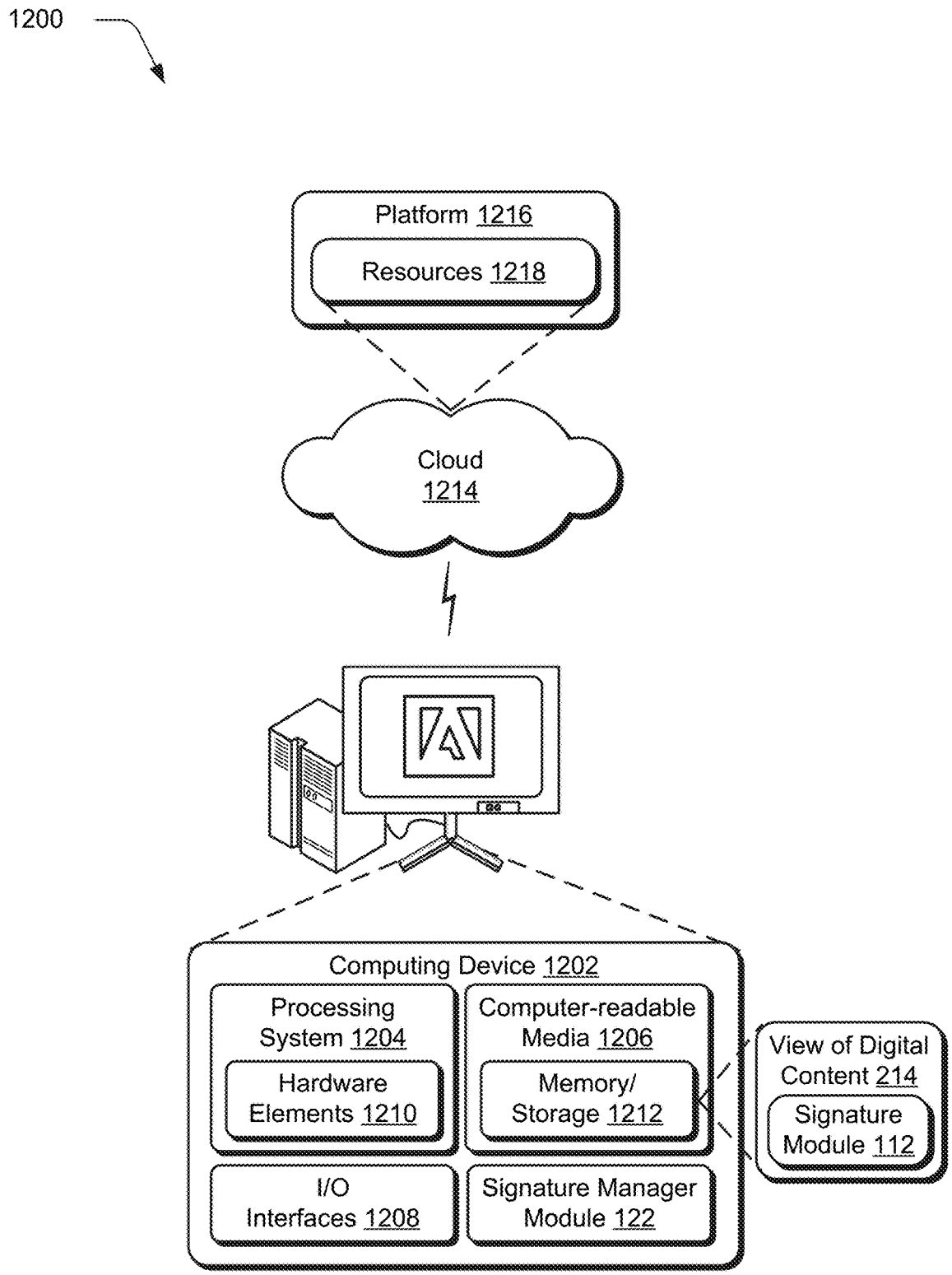
FIG. 12 illustrates an example system including various components of an example device that can be implemented as any type of computing device as described and/or utilize with reference to FIGS. 1-11 to implement embodiments of the techniques described herein.

Additionally, a computing device may be representative of a plurality of different devices as a computer system, such as multiple servers utilized by a business to perform operations "over the cloud," of the conference management system 102 as further described in relation to FIG. 12.

The conference management system 120, host device 104, and plurality of client devices 106, 108 are configured to implement an online conference via the network 110. As previously described, the online conference is an online collaborative service, via which, attendees of the conference interact via the network 110. This interaction may involve use of audio and/or video communicated over the network 110, such as to share video and audio of attendees of the conference, a host of the conference solely, and so on. Online conferences may take a variety of forms, such as web seminars, webcasts, web meetings, and other collaborative sessions implemented via a network such as the Internet. As such, online conferences may be used to connect attendees in real time across a wide range of geographic distances (e.g., different offices within the same building to across the world) to interact regarding whatever topic is desired using respective computing devices.

Online conferences may take a variety of forms. In one example, the online conference is implemented between the host device 104 and the client devices 106, 108 through use of an intermediary, i.e., the conference management system 102. The conference management system 102, for instance, includes a conference manager module 112 that is implemented at least partially in functionality of at least one computing device to manage authentication, generation of user interface, and distribution of audio and/or video data between the host device 104 and the client devices 106, 108. In another example, the online conference is implemented using a peer-to-peer network and thus does not use the conference management system 102. Rather, functionality of the conference management system 102 is implemented by the "peers" of the network, e.g., the host device 104 and/or client devices 106, 108.

The host device 104 and the client devices 106, 108 are named as such in the example digital medium environment 100 to indicate different functionalities that may be made available to a host and attendees of the online conference, respectively. The host device 104, for instance, includes a conference host module 114 to initiate the online conference, manage access by attendees to the online conference, and control sharing of audio, video, and digital content as part of the online conference.

The client devices 106, 108 include respective conference client modules 116, 118, via which, attendees that interact with the client devices 106, 108 may access the online conference but do not have the functionality of the host device 104 to manage the online conference. The conference client modules 116, 118, for instance, may request permission from the conference host module 114 to share digital content, assume control of screen sharing, and so forth as permitted by the conference host module 114.

Other examples are also contemplated in which each attendee of the conference has access to this functionality, e.g., each attendee of the online conference can share digital content, invite other attendees, and so forth. Further, this may be performed directly between the host device 104 and client devices 106, 108 via a peer-to-peer network or indirectly through the conference management system 102, e.g., to share digital content stored in storage 120 of the conference management system 102.

The conference host module 114, in the illustrated example, is illustrated as including a signature manager module 122 implemented at least partially in hardware of a computing device. The signature manager module 122 is configured to manage collection of electronic signatures for inclusion as part of digital content 124 within an online conference. The signature manager module 122, for instance, may communicate signature modules to respective attendees to collect electronic signatures from the respective attendees of the online conference as specified by the host device 104. This may also include collection of data usable to verify authenticity of the electronic signature, which is referred to as an audit trail. An example of configuration of the digital content 124 for collection of electronic signatures is described in the following description in relation to FIGS. 2-5. An example of collection of electronic signatures using the configured digital content 124 is described in relation to FIGS. 6-11.

Configuration of Digital Content to Collect Electronic Signatures

Figure 2:
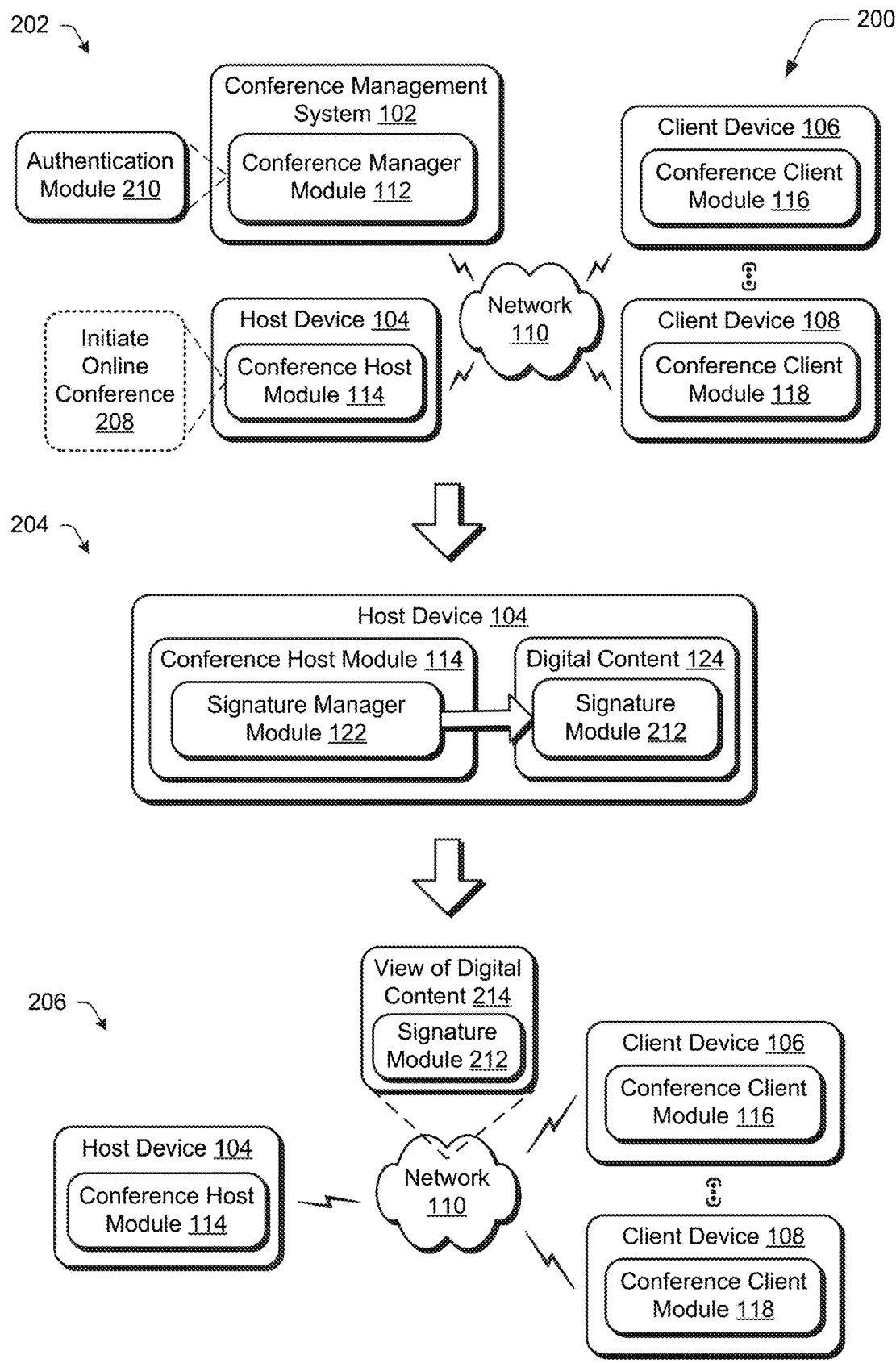
FIG. 2 depicts a system in an example implementation in which digital content is configured to collect electronic signatures by a host device as part of an online conference.
Figure 3:
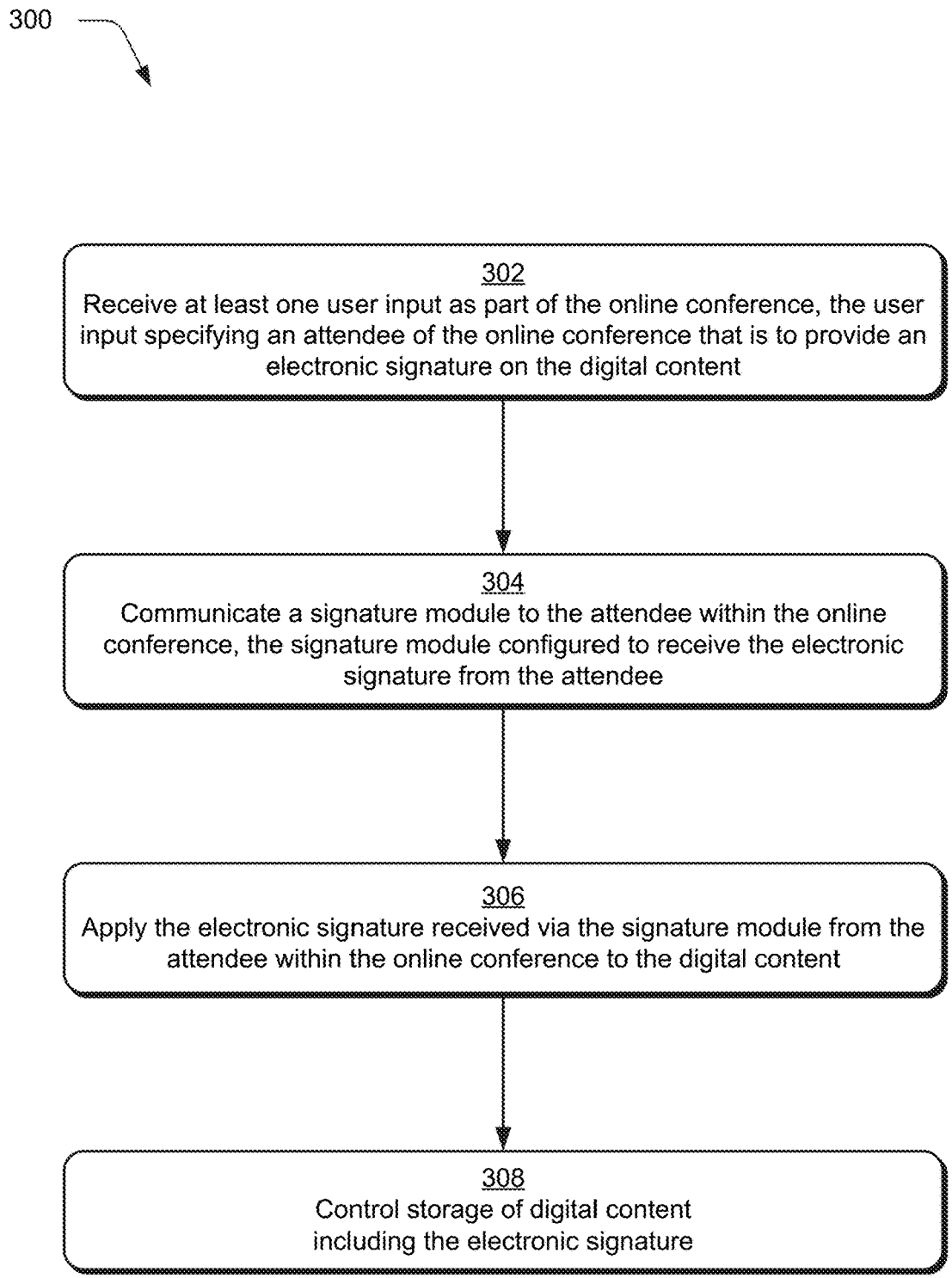
FIG. 3 is a flow diagram depicting a procedure in an example implementation in which digital content is configured to collect electronic signatures by a host device as part of an online conference.
Figure 4:
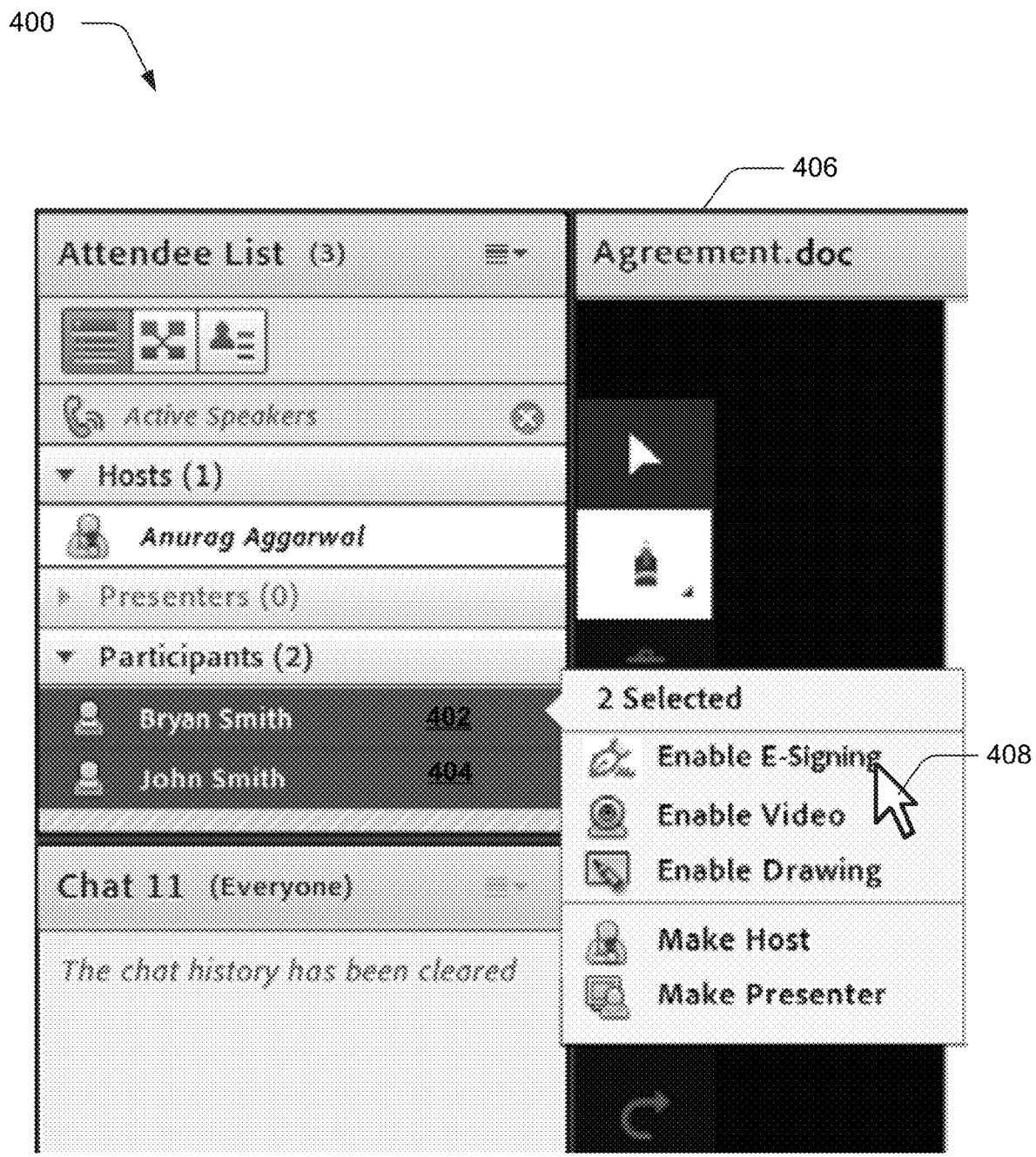
FIG. 4 depicts a user interface in an example implementation in which an attendee of an online conference is selected by a host device to electronically sign digital content within an online conference.
Figure 5:
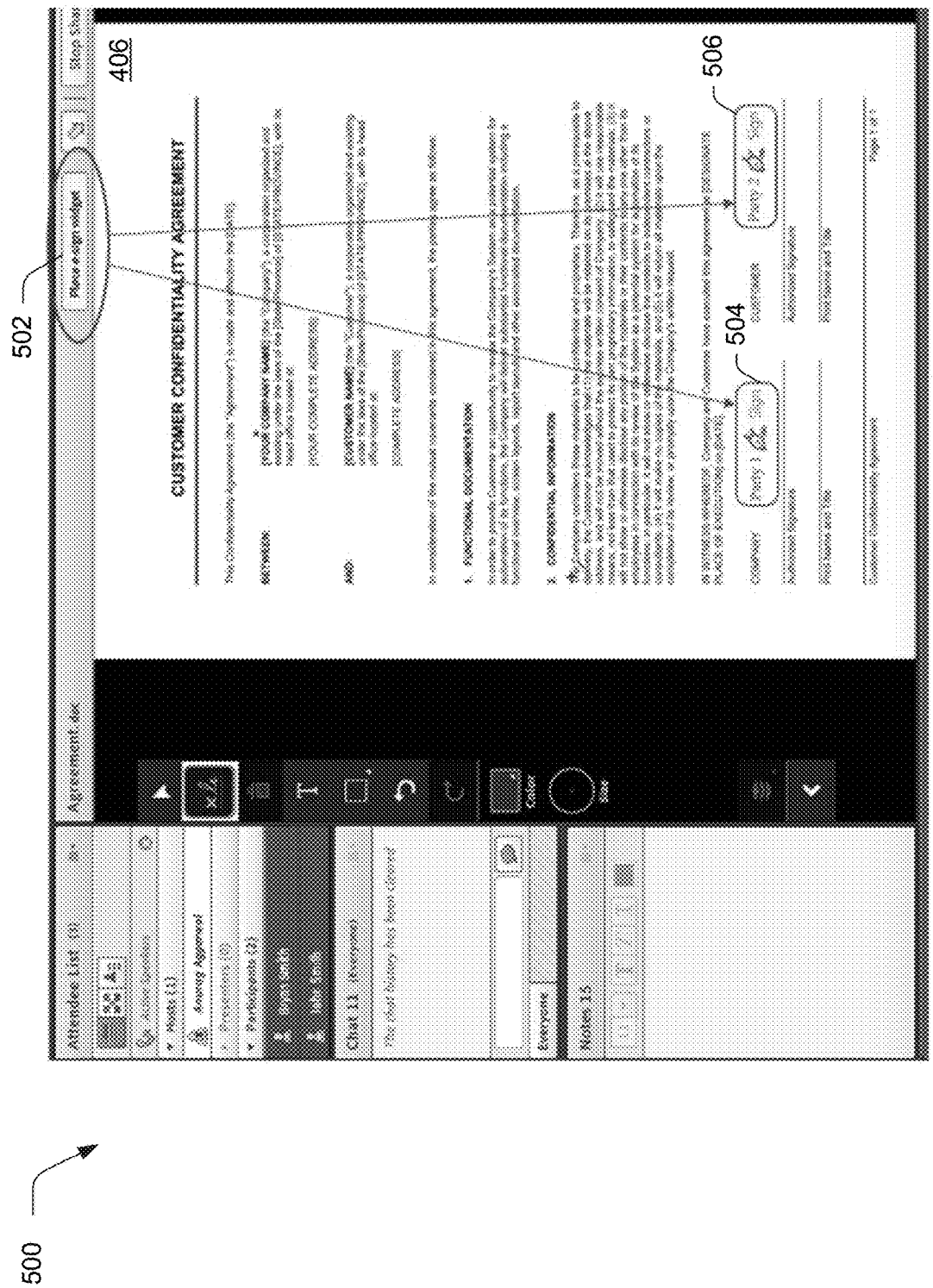
FIG. 5 depicts a user interface in an example implementation in which a host device is used to position a representation of a signature module within digital content at a location, at which, the electronic signature is to be inserted as part of the digital content.

FIG. 2 depicts a system 200 and FIG. 3 depicts a procedure 300 in an example implementation in which electronic signatures are collected within an online conference. FIG. 2 is illustrated using first, second, and third stages 202, 204, 206. FIG. 4 depicts a user interface 400 in an example implementation in which an attendee of an online conference is selected by a host device to electronically sign digital content as part of an online conference. FIG. 5 depicts a user interface 500 in an example implementation in which a host device is used to position a representation of a signature module within digital content at a location, at which, the electronic signature is to be inserted as part of the digital content. In this section, reference is made interchangeably to FIGS. 2-5.

In general, functionality, features, and concepts described in relation to the examples above and below may be employed in the context of the example procedure described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

To begin, an online conference is initiated 208 by the conference host module 114 at the first stage 202 of FIG. 2. A host interacting with the host device 104, for instance, may cause creation of meeting place URL which is shared with attendees that are to participate in the online conference. This may involve interaction with a conference management system 102 or directly between the host device and client devices 106, 108 of the attendees that are invited to the online conference.

As part of this, the online conference may be set as "private" such that attendees are specifically invited to attend the online conference by specifying an email address or other user identifier. This provides a first level of authentication as part of joining the online conference. A host of the host device 104, for instance, may specify email addresses of the attendees as part of an invitation that includes a meeting place URL describing "where" the online conference is to occur. Therefore, access to this online conference is limited at this first level of authentication to users that have received the invitation. A second level of authentication may also be employed in which the users of the client device 106, 108 upon selection of URL are placed in a queue and a notification is sent to the host device 104 to request access to the online conference. The host, through interaction with a user interface of the conference host module 114, may then approve the request to permit access. This may be performed by the conference host module 114 and/or remotely as part of an authentication module 210 of the conference manager module 112. Data describing that this authentication has been performed may also be stored as part of the audit trail as further described in the following. Other examples are also contemplated, including setting of the online conference as public and thus not limiting access to the online conference.

At the second stage 204, the host interacts with the signature manager module 122 of the host device 104 to cause collection of an electronic signature. As part of this, at least one user input is received as part of the online conference. The user input specifies an attendee of the online conference that is to provide an electronic signature on digital content (block 302). As shown in the user interface 400 of FIG. 4, a host interacts with the user interface 400 to select (e.g., highlight) two attendees 402, 404 of the online conference that are to sign digital content 408 that is shared as part of the online conference, e.g., "Agreement.doc."

In an implementation, functionality of the online conference to initiate use of the signature module 212 to collect signatures is limited to the host of the online conference. In this way, the host may control collection of electronic signatures from attendees that have been invited by the host as part of the online conference through interaction with the signature manager module 122. Other implementations are also contemplated in which functionality of the signature manager module 122 is implemented using the conference client modules 116, 118 may be "passed" for use by the attendees from the host in a manner similar to how screen sharing may be passed in the online conference, and so forth.

A signature module 212 is communicated to the attendee within the online conference. The signature module is configured to collect the electronic signature from the attendee (block 304). As shown in the user interface 500 of FIG. 5, for instance, an option 502 "place e-sign widget" is output. The option 502 is selectable to place a representation of the signature module 212 at respective locations within the digital content 406, at which, electronic signatures are to be inserted within the digital content 406.

A first representation 504, for instance, is configured to mimic a physical signature sticker as "party 1, sign" is placed at a location within the digital content that corresponds to the first party, e.g., "Bryan Smith" of FIG. 4. The host, for instance, may use a cursor control device, gesture, and so forth to position the representation 504 within the user interface. Thus, the representation 504 is moveable by the host to a desired location within the digital content 406. Likewise, a second representation 506 may also be positioned within the digital content 406 by the host.

The signature manager module 122 may also be configured to automatically place the representation of the signature module 212 within the digital content 124 to likely locations. The signature manager module 122, for instance, may employ text and image recognition to locate signature lines that correspond to respective attendees, e.g., has the name of the attendee, indication of "first" or "second" party, and so forth. This initial placement may then be further modified by the host through interaction with the user interface as previously described, such as to correct this initial placement.

At the third stage 206, a view of the digital content 214 having the inserted signature module 212 is shared for viewing by the attendees that are to sign the digital content 124 within the online conference. The conference host module 114, for instance, may receive a user input to then collect electronic signatures, which causes transmission of the signature module 212 via the network 110.

Electronic signatures, collected through user interaction with the signature modules 212, are then applied to the digital content (block 306). For example, data including the electronic signature and position of the electronic signature as applied to the view of the digital content is communicated back to the host device 104 or conference management system 102. The electronic signature, based on the location, is then inserted as part of the digital content 124 by the host device 104.

Storage is then controlled of the digital content as having the applied electronic signatures (block 308), such as to cause local storage at the host device 104 and/or remote storage as part of the conference management system 102. This may also include storage of associated data describing how the electronic signature is collected, i.e., audit trail data. Further discussion of collection of the electronic signature for inclusion as part of the digital content 124 through interaction with the signature module 212 is described in the following section and shown in corresponding figures.

Collection of an Electronic Signature

Figure 6:
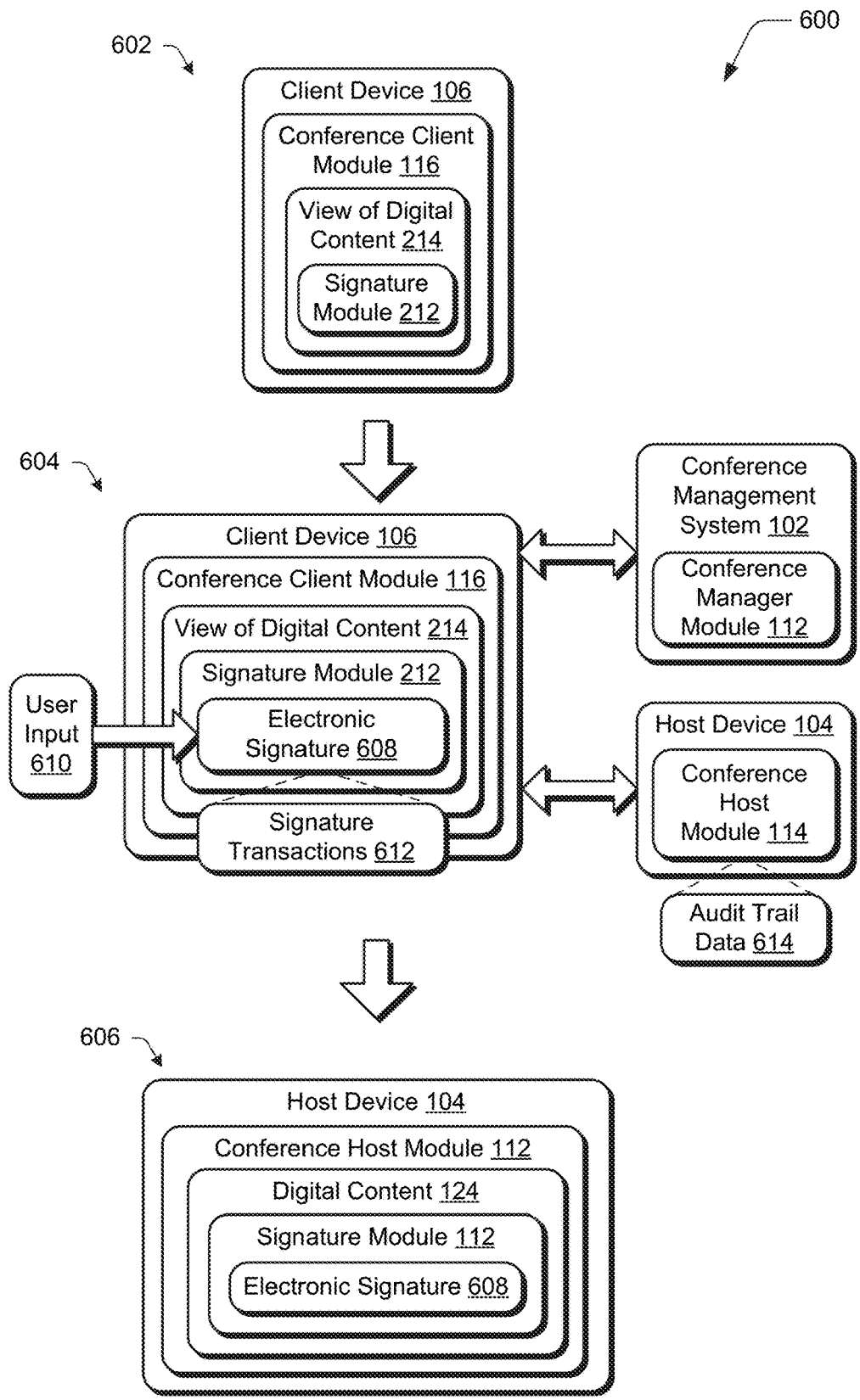
FIG. 6 depicts a system in an example implementation in which an electronic signature is collected as part of digital content within an online conference.
Figure 7:
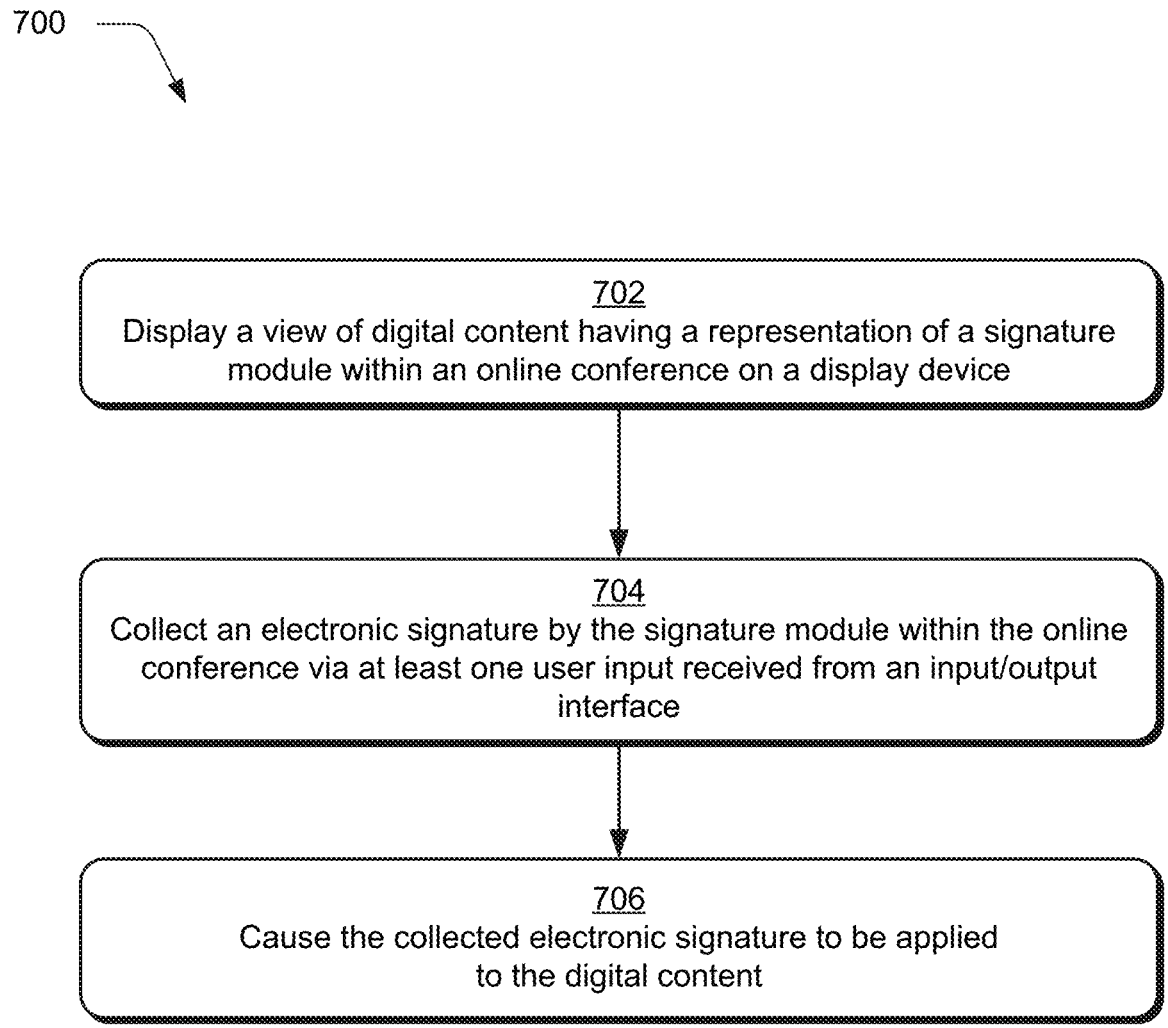
FIG. 7 is a flow diagram depicting a procedure in an example implementation in which an electronic signature is collected within an online conference.
Figure 8:
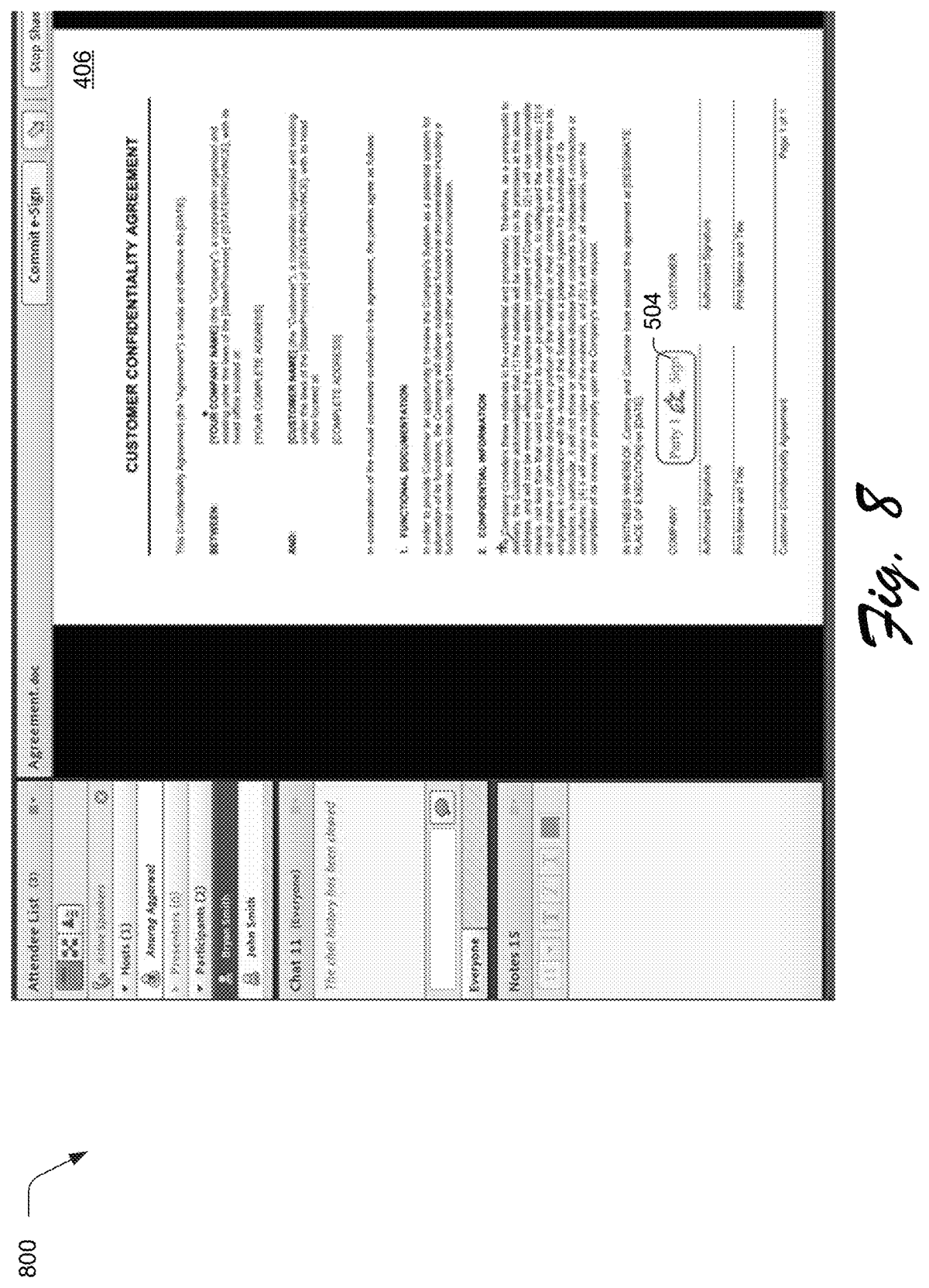
Figure 9:
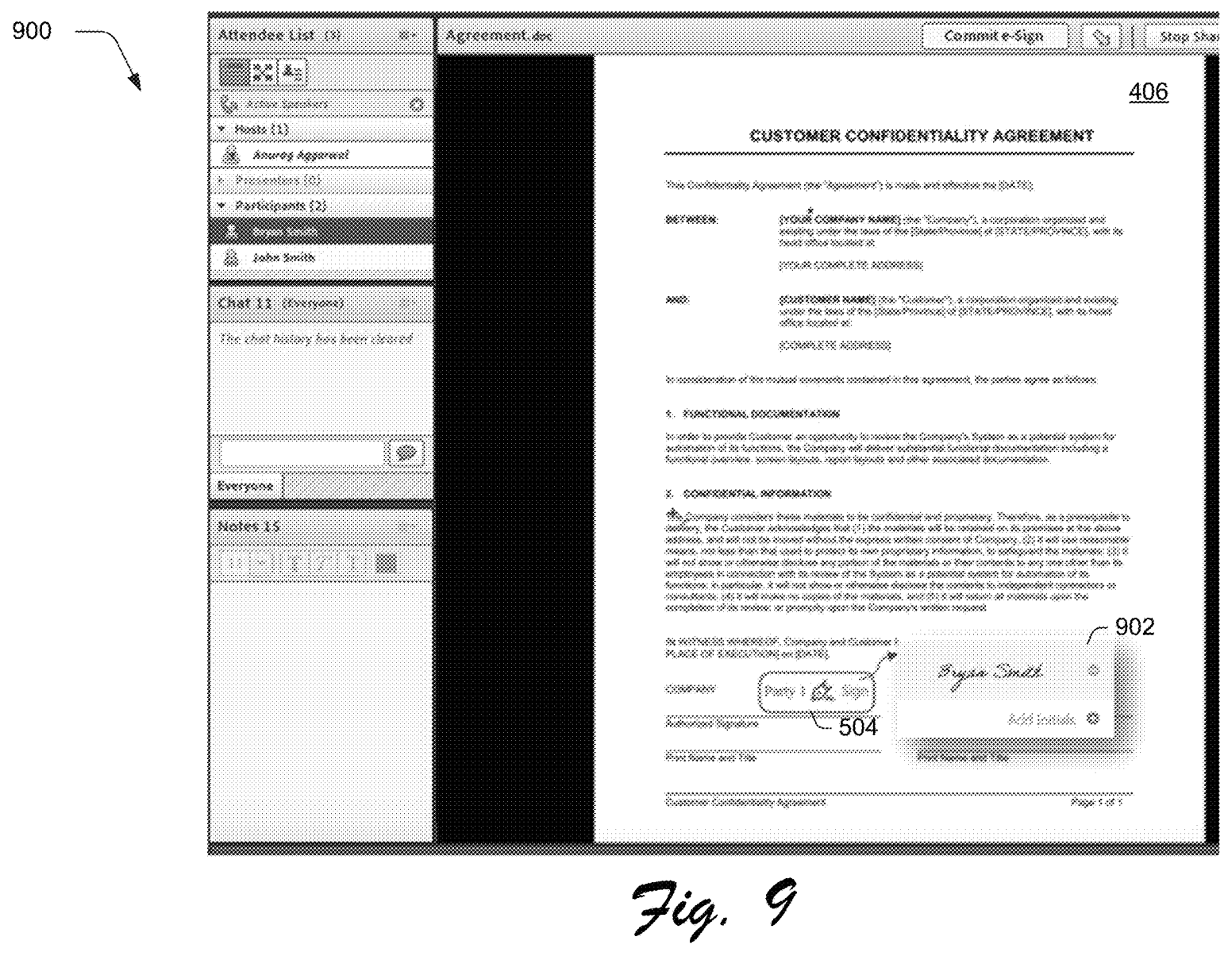
Figure 10:
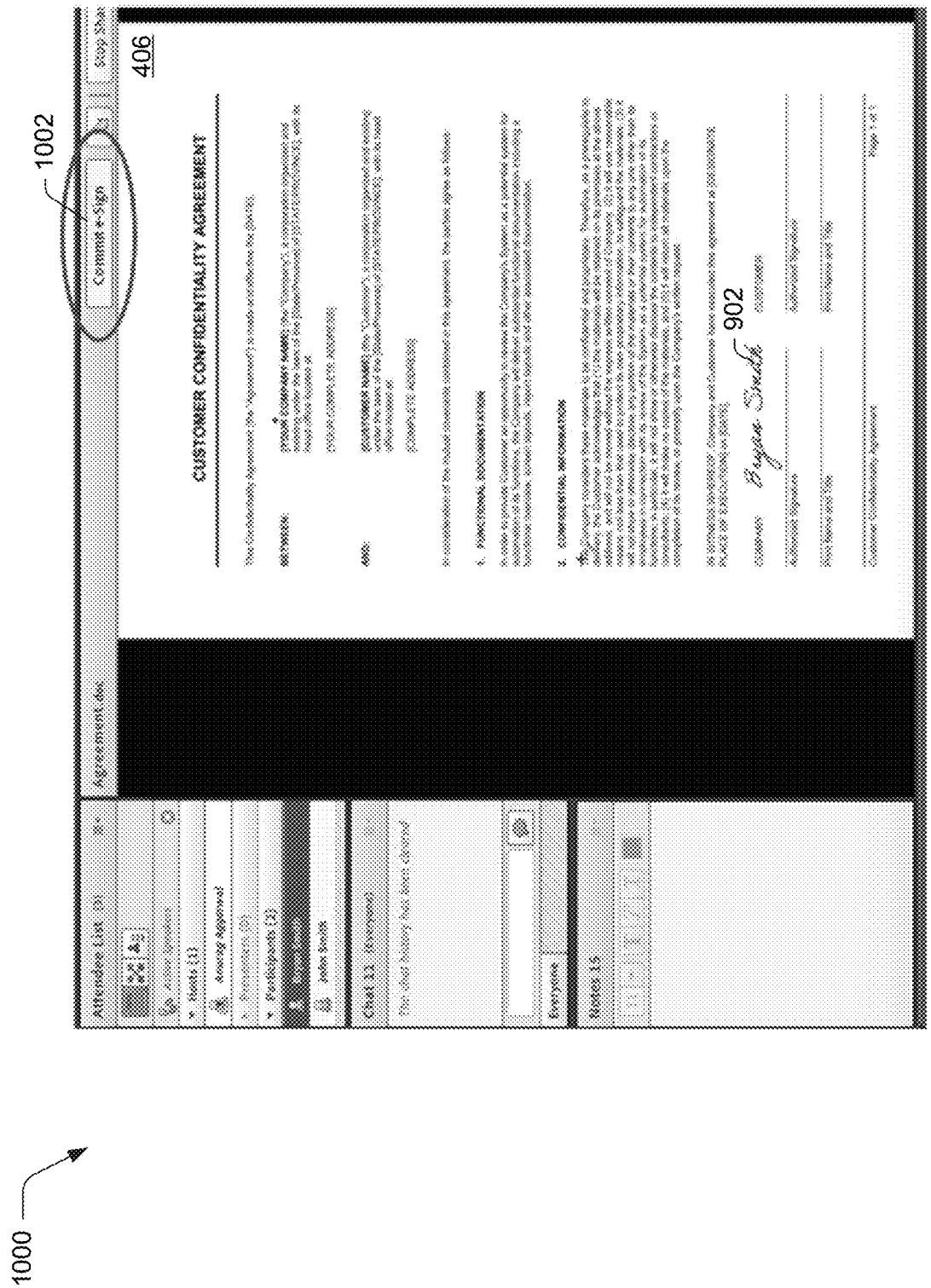
FIG. 10 depicts a user interface in an example implementation in which the collected electronic signature is committed as part of the digital content.
Figure 11:
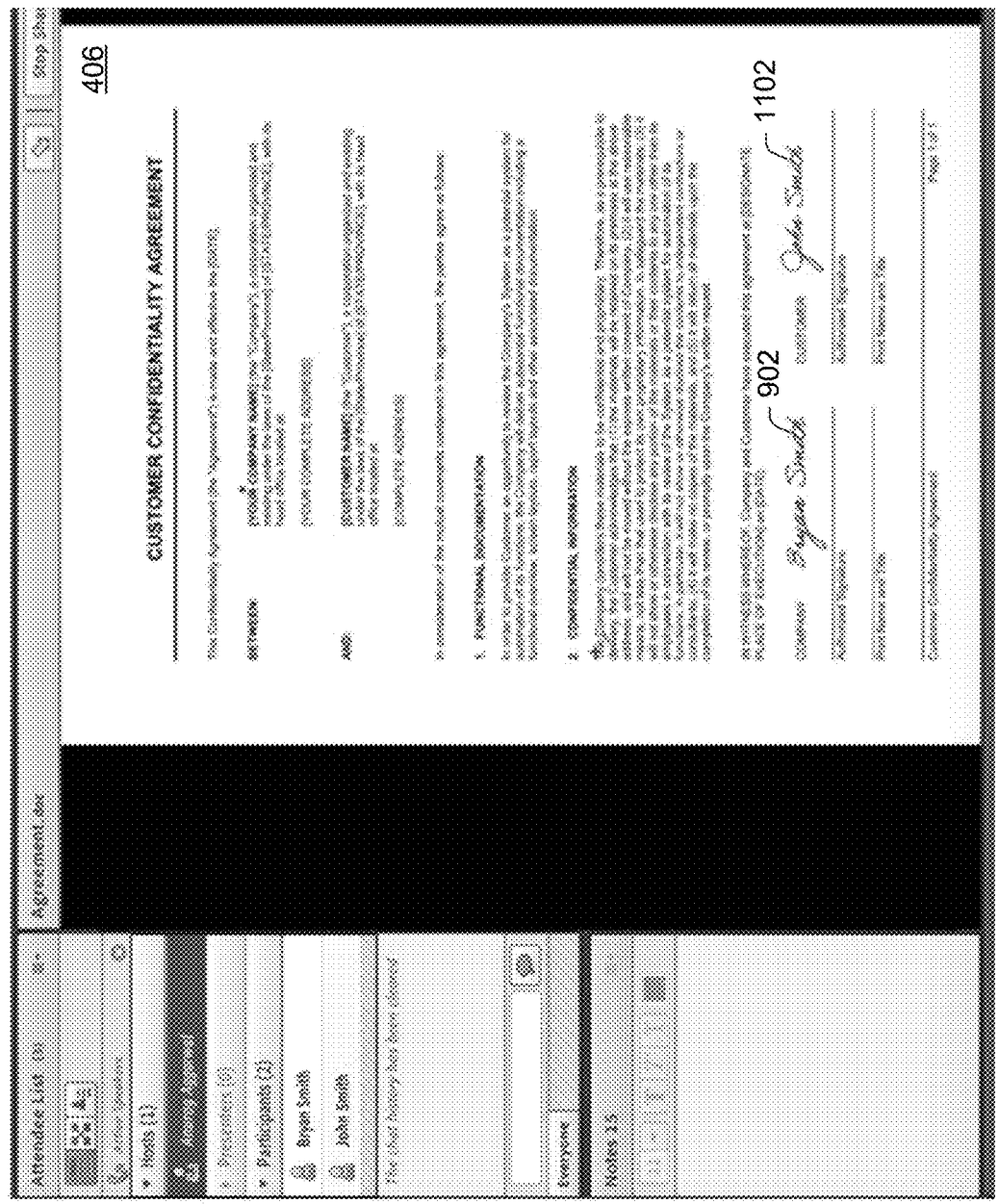
FIG. 11 depicts a user interface in an example implementation in which the digital content includes electronic signatures from a plurality of attendees as viewed by a host of the online conference.

FIG. 6 depicts a system 600 and FIG. 7 depicts a procedure 700 in an example implementation in which an electronic signature is collected within an online conference. FIG. 6 is illustrated using first, second, and third stages 602, 604, 606. FIG. 8 depicts a user interface 800 in an example implementation in which an attendee of an online conference is exposed to a representation of a signature module that is to be used to collect an electronic signature from the attendee. FIG. 9 depicts a user interface 900 in an example implementation in which an electronic signature is collected from the attendee of FIG. 8. FIG. 10 depicts a user interface 1000 in an example implementation in which a user input is received to cause the collected electronic signature to be committed as part of the digital content. FIG. 11 depicts a user interface 1100 in an example implementation in which the digital content includes signatures from a plurality of attendees as viewed by a host of the online conference. In this section, reference is made interchangeably to FIGS. 6-11.

To begin, a view of digital content having a representation of a signature module is displayed within an online conference on a display device (block 702), e.g., display through the conference client module 116. As shown at the first stage 602, for instance, the client device 106 receives the view of the digital content 214 having the signature module 212 as configured in the previous section. The view of the digital content 214 is output in the user interface 800 of FIG. 8. Because the view of the digital content 214 is output by the client device 106 that corresponds to the attendee "Bryan Smith" of the online conference, the representation 504 of the signature module that is to collect the signature from Bryan Smith is output and other representations corresponding to other attendees are not output, such as from "John Smith." This may be performed in a variety of ways, such as through communication of a version of the signature module for use by the first attendee and not the second attendee, through authentication performed by the conference client module 116 locally at the client device 106 to control output of a corresponding signature module, and so forth.

An electronic signature is collected by the signature module within the online conference via at least one user input received from an input/output interface (block 704). As shown at the second stage 604, for instance, the electronic signature 608 is collected through interaction with the signature module 212 within the view of the digital content 214. This is performed responsive to a user input 610 to specify inclusion of the electronic signature 608, e.g., through use of a keyboard, cursor control device, gesture, spoken utterance, and so forth. Collection of the electronic signature 608 by the signature module 212 may be performed in a variety of ways.

As shown at the user interface 900 of FIG. 9, for instance, the representation 504 to provide an electronic signature by "Bryan Smith" is displayed as part of the view of the digital content 406 in the user interface 900. The representation 504 is displayed at a location, at which, the electronic signature 902 is to be included within the digital content 406.

The attendee then selects the representation 504 to insert an electronic signature 902, e.g., via a cursor control device or gesture which is then received via an input/output interface. This may be performed locally through manual interaction of the attendee with the user interface 900, such as to draw or type the electronic signature 902 using a stylus, cursor control device, keyboard, and so forth. This may also be performed to insert a previously stored electronic signature locally from the client device 106 and/or remotely from storage 120 of the conference management system 102. In order to import the electronic signature 902 from remote storage 120, the conference manager system 102 or other network service may authenticate the attendee, e.g., through use of a user name and password.

Regardless of how the electronic signature 902 is collected, the signature module 212 then outputs an option 1002 to commit the electronic signature 608 for storage as part of the digital content 406, e.g., at the host device 104 and/or conference management system 102. Once committed, the electronic signature 608 is not further modifiable by a user (e.g., conference attendee) as part of the digital content 406, e.g., the representation 504 of the signature module 122 is removed from the user interface 1000 of the client device 106.

As the electronic signature 608 is collected by the signature module 212 of the client device 106, the conference management system 102 and/or host device 104 may witness the signing within the online conference. A host associated with the host device 104, for instance, may witness display of the user interfaces 800, 900, 1000, attendee interaction with the user interface including how the electronic signature is collected, and may even receive audio and/or video data as part of the online conference of the attendee as providing the signature. In this way, the host and even other attendees of the online conference, as permitted by the host, may witness collection of the electronic signature which was not possible using conventional electronic signature techniques.

Data may also be collected that describes signature transactions 612 involved in collection of the electronic signature 608, which may be stored as audit trail data 614 that is usable to authenticate and verity the electronic signature 608. The audit trail data 614, for instance, may describe user credentials, time stamps of the signature transactions 612, identification of a device (e.g., network address of client device 106) used to collect the electronic signature 608, source of the electronic signature 608 (e.g., local or remote), and so forth. The audit trail data 614 may also include authentication data employed to perform the online conference, such as if the online conference is set as public or private, whether invitations are used, notifications employed to permit access, a URL of the online conference, and so forth.

As shown at the third stage 606, the collected signature is caused to be applied to the digital content (block 706), e.g., by the host device 104 and/or conference management system 102. As shown in the user interface 1100 of FIG. 11, for instance, the digital content 406 includes the electronic signature 902 for "Bryan Smith" as collected in FIGS. 8-10 and an electronic signature 1102 for "John Smith" which may be collected using similar techniques. In this way, the host of the online conference may store the digital content 406 as signed within the online conference, may witness the provision of the electronic signatures, and may capture audit trail data usable to verify the online signature. This may also be used as part of document level operating workflows, such as through configuration of the electronic signatures as an electronic stamp to indicate approval or rejection of parts of the digital content as an aid to an author, approver, or attendee without requiring the attendees to be physically present at a same geographic location.

In the above examples, the host device maintains a "master" version of the digital content 124, view 214 of which are provided to attendees of the conference to electronically sign through interaction with a signature module 212. Other examples are also contemplated, such as to communicate versions of the digital content 124 having the signature module 212 to respective attendees, which are then collected by the host device 104 and/or conference management system 102. These versions may be merged into a single version of the digital content 124 or maintained separately in storage.

Example System and Device

FIG. 12 illustrates an example system generally at 1200 that includes an example computing device 1202 that is representative of one or more computing systems and/or devices that may implement the various techniques described herein. This is illustrated through inclusion of the signature manager module 122 and view of the digital content 214 having the signature module 112. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   initiating, by a processing device, an online video conference including real time video of a first attendee associated with a first client device and real time video of a second attendee associated with a second client device;
   authenticating, by the processing device, the second attendee of the second client device as verified by a host of the online video conference;
   receiving, by the processing device, data from the first client device, the data identifying:
      digital content to be signed as part of the online video conference, the digital content including a signature module specific to the second attendee; and
      the second attendee is to provide an electronic signature, the second attendee identified via selection of a corresponding representation in a user interface output by the first client device as part of the online video conference;
   communicating, by the processing device, the digital content to the second client device, the digital content supporting user interaction via a user interface output by the second client device as part of the online video conference to input the electronic signature;
   receiving, by the processing device, data in real time from the second client device depicting input of the electronic signature, the input of the electronic signature performed responsive to selection of the signature module at the second client device;
   communicating, by the processing device to the first client device, the data depicting input of the electronic signature for output by a user interface of the first client device;
   receiving, by the processing device from the second client device, the digital content including the electronic signature collected by the signature module; and
   communicating, by the processing device, the digital content including the electronic signature to the first client device, the communicated digital content having the electronic signature included as a part thereof along with audit trail data describing configuration settings to initiate the online video conference.

2. The method as described in claim 1, wherein the signature module is selectable via the user interface output by the second client device to initiate input of the electronic signature.

3. The method as described in claim 2, wherein the signature module is positioned within the digital content via the user interface output by the first client device.

4. The method as described in claim 1, wherein the authenticating the second attendee of the second client device further includes authenticating access into the online video conference using a particular user identifier and password.

5. The method as described in claim 1, wherein the user interface output by the second client device as part of the online video conference to input the electronic signature includes a display of the digital content, a display of the signature module that is user selectable to input the electronic signature, and representations of the first and second attendees.

6. The method as described in claim 1, wherein the audit trail data includes authentication data employed to perform the online video conference.

7. The method as described in claim 1, wherein the audit trail data describes notification settings associated with permitting access to the online video conference.

8. The method as described in claim 1, wherein the audit trail data describes whether invitations are used as part of the online video conference to authenticate the first attendee and the second attendee.

9. A method comprising:
   receiving, by a processing device, requests from a first client device and a second client device to join an online conference;
   approving, by the processing device, the requests to permit the first client device to join the online conference as a first attendee and the second client device to join the online conference as a second attendee;
   communicating, by the processing device, a first version of digital content to the first client device, the first version of the digital content including a first attendee specific signature module configured to collect a first electronic signature from the first attendee;
   communicating, by the processing device, a second version of the digital content to the second client device, the second version of the digital content including a second attendee specific signature module configured to collect a second electronic signature from the second attendee;
   communicating, by the processing device to the first client device, data depicting input of the second electronic signature at the second client device;
   communicating, by the processing device to the second client device, data depicting input of the first electronic signature at the first client device;
   collecting, by the processing device, the first version of the digital content including the first electronic signature and without the second electronic signature from the first client device and the second version of the digital content including the second electronic signature and without the first electronic signature from the second client device;

generating, by the processing device, a merged version of the digital content by merging the first version of the digital content having the first electronic signature and without the second electronic signature from the first client device and the second version of the digital content having the second electronic signature without the first electronic signature from the second client device; and communicating, by the processing device, the merged version of the digital content having both the first electronic signature and the second electronic signature to the first and second client devices.

10. The method as described in claim 9, wherein:

the first version of the digital content includes audit trail data describing inclusion of the first electronic signature as part of the first version of the digital content at the first client device; and the second version of the digital content includes audit trail data describing inclusion of the second electronic signature as part of the second version of the digital content at the second client device.

11. The method as described in claim 10, wherein the audit trail data describes features of a device involved in the collection of the first and second electronic signatures.

12. The method as described in claim 9, wherein the first attendee specific signature module and the second attendee specific signature module are selectable via a user interface to initiate input of the first and second electronic signatures locally at the first client device and the second client device, respectively.

13. The method as described in claim 9, wherein collecting the first electronic signature includes importing a previously stored electronic signature of the first attendee, the importing including authenticating the first attendee through use of a user name and password.

14. A system comprising:

a memory; and a processing device coupled to the memory, the processing device to perform operations comprising:

initiating an online video conference including real time video of a first attendee associated with a first client device and real time video of a second attendee associated with a second client device;

authenticating the second attendee of the second client device as verified by a host of the online video conference;

receiving data from the first client device, the data identifying:

digital content to be signed as part of the online video conference, the digital content including a signature module specific to the second attendee; and the second attendee is to provide an electronic signature, the second attendee identified via selection of a corresponding representation in a user interface output by the first client device as part of the online video conference;

communicating the digital content to the second client device, the digital content supporting user interaction via a user interface output by the second client deice as part of the online video conference to input the electronic signature;

receiving data in real time from the second client device depicting input of the electronic signature, the input of the electronic signature performed responsive to selection of the signature module at the second client device;

communicating, to the first client device, the data depicting input of the electronic signature for output by a user interface of the first client device;

receiving, from the second client device, the digital content including the electronic signature collected by the signature module; and communicating the digital content including the electronic signature to the first client device, the communicated digital content having the electronic signature included as a part thereof along with audit trail data describing configuration settings to initiate the online video conference.

15. The system as described in claim 14, wherein the signature module is selectable via the user interface output by the second client device to initiate input of the electronic signature.

16. The system as described in claim 15, wherein the signature module is positioned within the digital content via the user interface output by the first client device.

17. The system as described in claim 14, wherein the authenticating the second attendee of the second client device further includes authenticating access into the online video conference using a particular user identifier and password.

18. The system as described in claim 14, wherein the user interface output by the second client device as part of the online video conference to input the electronic signature includes a display of the digital content, a display of the signature module that is user selectable to input the electronic signature, and representations of the first and second attendees.

19. The system as described in claim 14, wherein the audit trail data further describes collection of the electronic signature.

20. The system as described in claim 19, wherein the audit trail data describes features of a device involved in the collection of the electronic signature.

* * * * *